(12) United States Patent
Pestana et al.

(10) Patent No.: US 11,223,034 B2
(45) Date of Patent: Jan. 11, 2022

(54) METHOD AND SYSTEM FOR THERMAL GRADIENT DURING ELECTRODE PYROLYSIS

(71) Applicant: Enevate Corporation, Irvine, CA (US)

(72) Inventors: Jill Renee Pestana, Long Beach, CA (US); Benjamin Park, Mission Viejo, CA (US); Michael Buet, Dana Point, CA (US); Giulia Canton, Irvine, CA (US)

(73) Assignee: Enevate Corporation, Irvine, CA (US)

( * ) Notice: Subject to any disclaimer, the term of this patent is extended or adjusted under 35 U.S.C. 154(b) by 46 days.

(21) Appl. No.: 16/878,217

(22) Filed: May 19, 2020

(65) Prior Publication Data
US 2021/0143395 A1  May 13, 2021

Related U.S. Application Data

(63) Continuation of application No. 16/679,141, filed on Nov. 8, 2019, now Pat. No. 10,673,062.

(51) Int. Cl.
*H01M 4/04* (2006.01)
*H01M 4/1395* (2010.01)
*H01M 4/38* (2006.01)
*H01M 4/02* (2006.01)

(52) U.S. Cl.
CPC ....... *H01M 4/0471* (2013.01); *H01M 4/1395* (2013.01); *H01M 4/386* (2013.01); *H01M 2004/027* (2013.01)

(58) Field of Classification Search
CPC .. H01M 4/0471; H01M 4/386; H01M 4/1395; H01M 2004/027
See application file for complete search history.

(56) References Cited

U.S. PATENT DOCUMENTS

| | | | | |
|---|---|---|---|---|
| 2011/0165468 | A1* | 7/2011 | Alias | C04B 35/62655 429/231.8 |
| 2012/0088150 | A1* | 4/2012 | Hwang | C08G 73/14 429/211 |
| 2014/0170482 | A1* | 6/2014 | Park | H01M 4/13 429/211 |
| 2014/0342232 | A1* | 11/2014 | Scharfegger | H01M 4/1395 429/231.4 |

(Continued)

*Primary Examiner* — Stewart A Fraser
(74) *Attorney, Agent, or Firm* — McAndrews, Held & Malloy, Ltd.

(57) ABSTRACT

Systems and methods for thermal gradient during electrode pyrolysis may include fabricating the battery electrode by pyrolyzing an active material on a metal current collector, wherein the active material comprises silicon particles in a binder material, the binder material being pyrolyzed such that a resistance at an inner surface of the active material in contact with the current collector is at least 50% higher than a resistance at an outer surface of the active material. The active material may be pyrolyzed by electromagnetic radiation, which may be provided by one or more lasers, which may include one or more $CO_2$ lasers. The electromagnetic radiation may be provided by one or more infrared lamps. An outer edge of the current collector may be gripped using a thermal transfer block that removes heat from the current collector during pyrolysis of the active material and subsequent cool down.

25 Claims, 6 Drawing Sheets

(56) References Cited

U.S. PATENT DOCUMENTS

| | | | |
|---|---|---|---|
| 2015/0340695 A1* | 11/2015 | Miki | H01M 4/587 423/325 |
| 2016/0126538 A1* | 5/2016 | Hanelt | H01M 10/0525 429/213 |
| 2016/0204420 A1* | 7/2016 | Toulis | H01M 4/1393 427/113 |

* cited by examiner

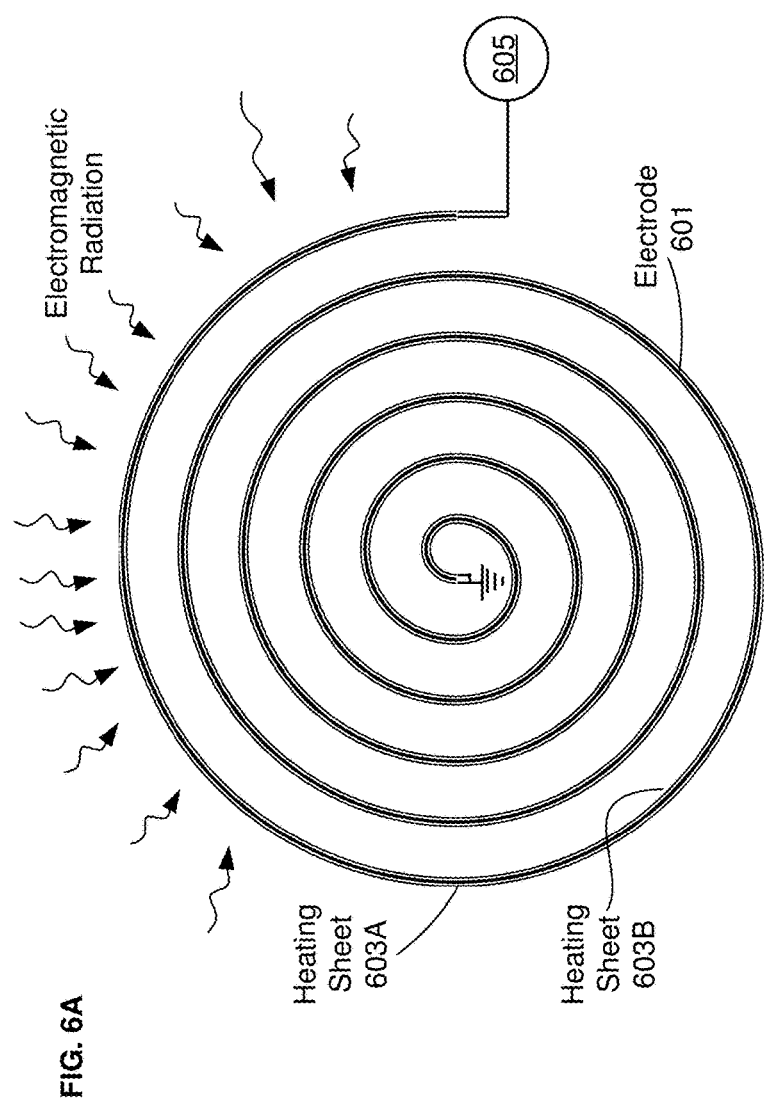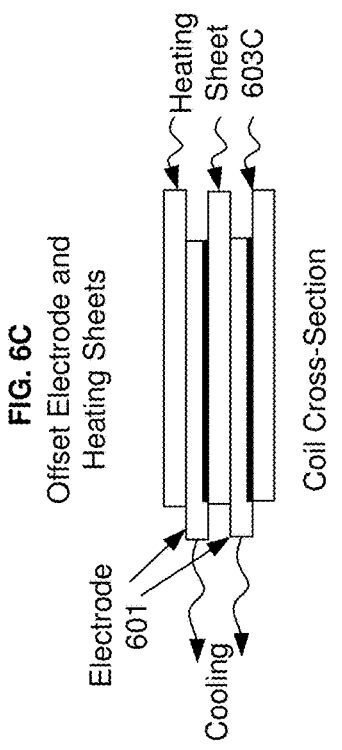

METHOD AND SYSTEM FOR THERMAL GRADIENT DURING ELECTRODE PYROLYSIS

CROSS-REFERENCE TO RELATED APPLICATIONS/INCORPORATION BY REFERENCE

This application is a continuation of U.S. patent application Ser. No. 16/679,141 filed on Nov. 8, 2019, now U.S. Pat. No. 10,673,062, which is hereby incorporated herein by reference in its entirety.

FIELD

Aspects of the present disclosure relate to energy generation and storage. More specifically, certain embodiments of the disclosure relate to a method and system for thermal gradient during electrode pyrolysis.

BACKGROUND

Conventional approaches for battery electrodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for thermal gradient during electrode pyrolysis, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 6A-6C illustrate another example pyrolysis method and apparatus with thermal gradients, in accordance with an example embodiment of the disclosure.

DETAILED DESCRIPTION

Figure 1:
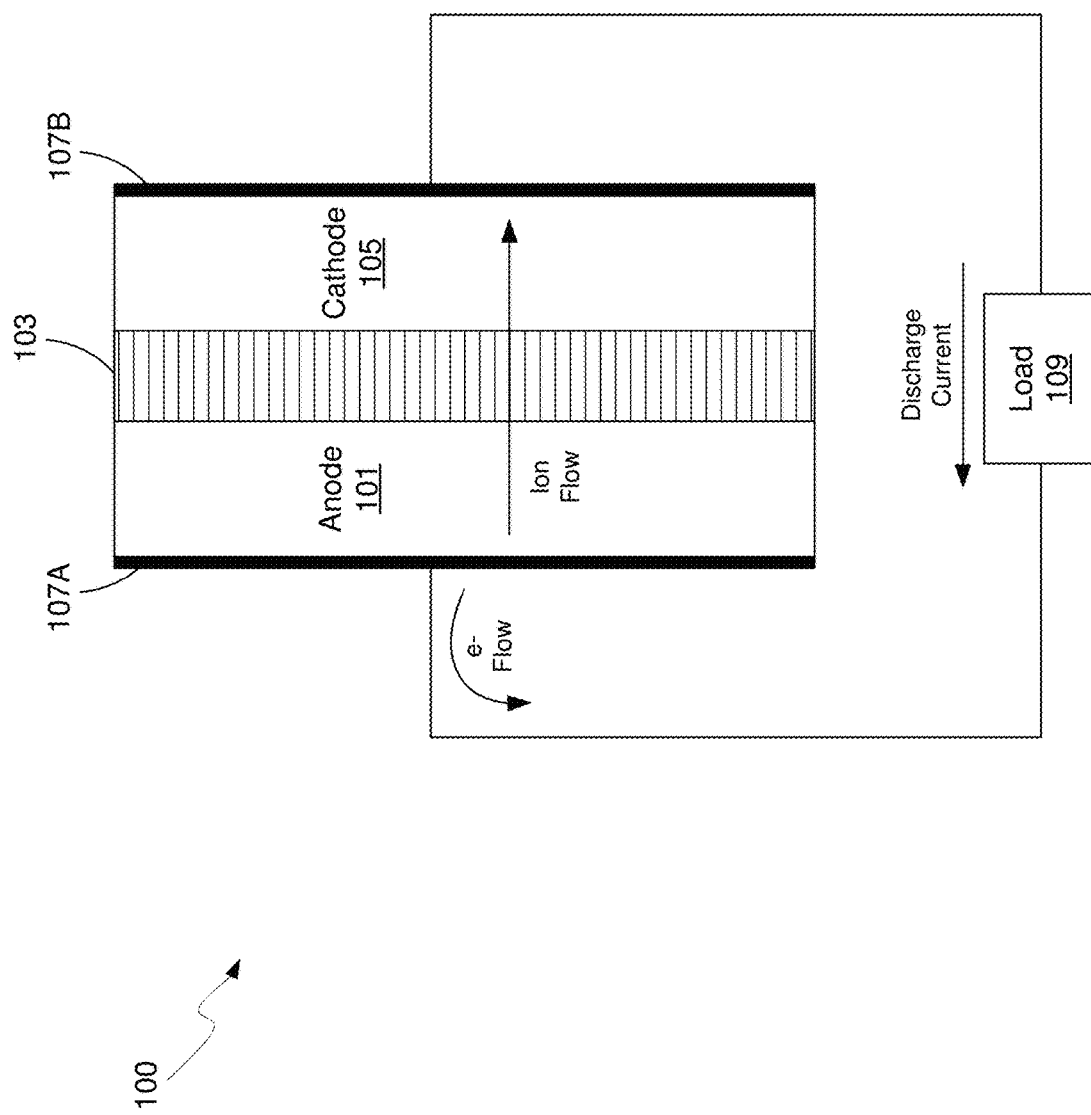
FIG. 1 is a diagram of a battery with a silicon-dominant anode, in accordance with an example embodiment of the disclosure.

FIG. 1 is a diagram of a battery with silicon-dominant anodes, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 1078, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. With demand for lithium-ion battery performance improvements such as higher energy density and fast-charging, silicon is being added as an active material or even completely replacing graphite as a dominant anode material. Most electrodes that are considered "silicon anodes" in the industry are graphite anodes with silicon added in small quantities (typically <20%). These graphite-silicon mixture anodes must utilize the graphite, which has a lower lithiation voltage compared to silicon; the silicon has to be nearly fully lithiated in order to utilize the graphite. Therefore, these electrodes do not have the advantage of a silicon or silicon composite anode where the voltage of the electrode is substantially above 0V vs Li/Li+ and thus are less susceptible to lithium plating. Furthermore, these electrodes can have significantly higher excess capacity on the silicon versus the opposite electrode to further increase the robustness to high rates.

Silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

The pyrolyzation of direct coated cathodes can result in adverse effects to the metal foil, such as when silicon or other active material is in contact with copper and the temperature gets high enough to cause a reaction between the two materials. One way to alleviate this is to have a temperature gradient between the top of the active material and metal foil, with the foil kept at a lower temperature, which is disclosed further with respect to FIGS. 3-5.

Figure 2:
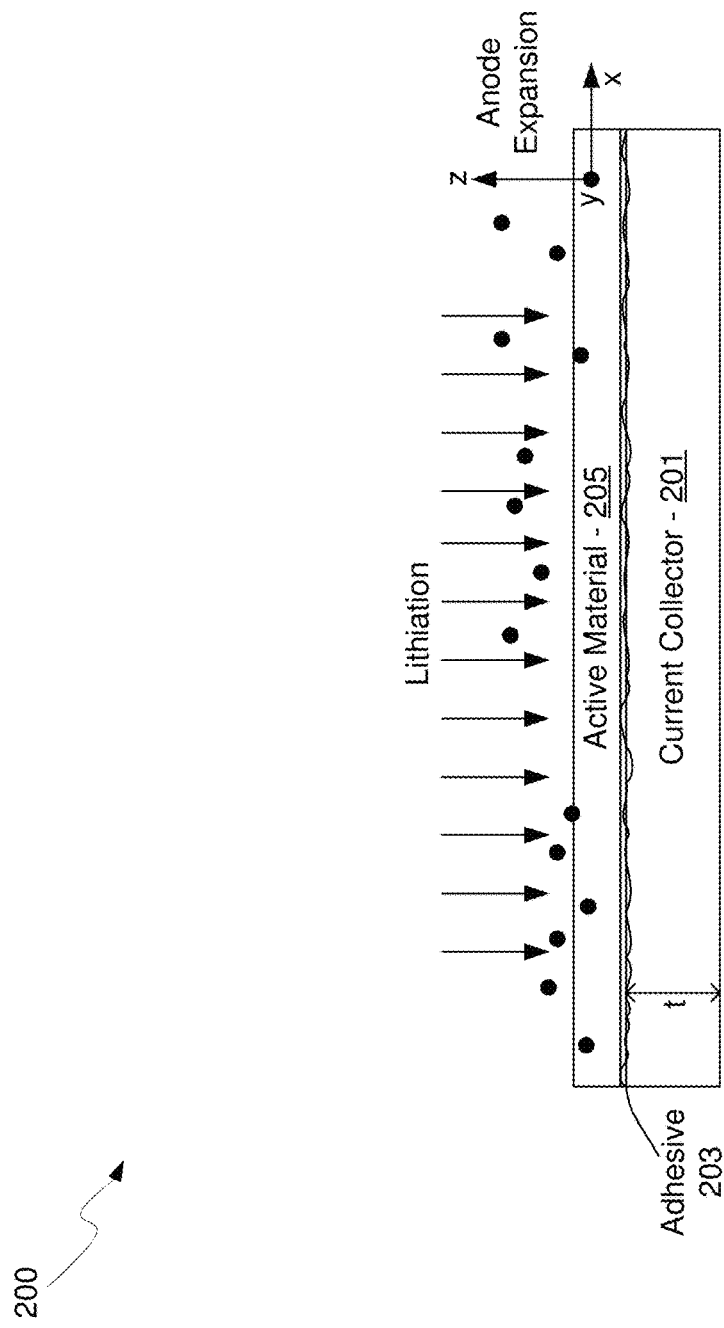
FIG. 2 illustrates an anode during lithiation, in accordance with an example embodiment of the disclosure.

FIG. 2 illustrates an anode during lithiation, in accordance with an example embodiment of the disclosure. Referring to FIG. 2, there are shown a current collector 201, adhesive 203, and an active material 205. It should be noted that the adhesive 203 may or may not be present depending on the type of anode fabrication process utilized, as the adhesive is not necessarily present in a direct coating process, and if present may be utilized before or after heat treatment. Furthermore, the layer thicknesses are not necessarily shown to scale, and the adhesive 203 is typically thin enough such that the active material 205 makes contact with the current collector 201 in various locations on the surface. In an example scenario, the anode active material 205 before pyrolysis comprises silicon particles in a binder material and a solvent, where the active material is pyrolyzed to turn the binder into a carbon that provides a structural framework around the silicon particles and also provides carbon for electrical conductivity. The active material may be coupled to the current collector 201 using the adhesive 203. The current collector 201 may comprise a metal film, such as copper, nickel, or titanium, for example, although other conductive foils may be utilized depending on desired tensile strength.

FIG. 2 also illustrates lithium ions impinging upon and lithiating the active material 205 when incorporated into a cell with a cathode, electrolyte, and separator (not shown). The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 10 µm thick, such as 20 µm for copper, for example, while thinner foils may be less than 10 µm, such as 5-6 µm thick for copper.

In an example scenario, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion. While FIG. 2 shows a single-sided anode, the disclosure is not so limited, as a double-sided anode may be fabricated in this process. Furthermore, while FIG. 2 illustrates an anode during operation, the thermal gradient pyrolysis heating disclosed is suitable for both anodes and cathodes.

Figure 3:
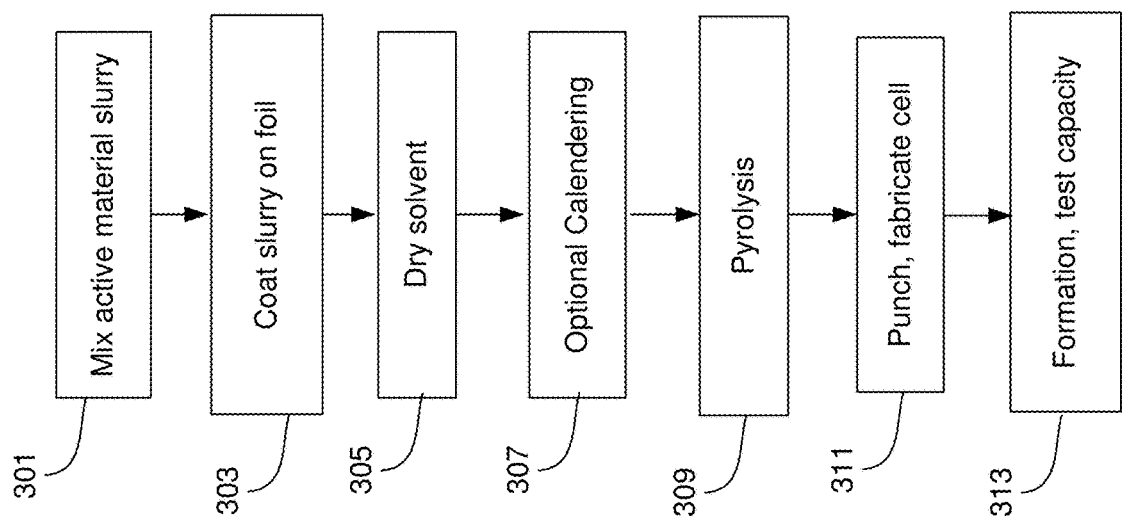
FIG. 3 is a flow diagram of a direct coating process for fabricating a cell, in accordance with an example embodiment of the disclosure.

FIG. 3 is a flow diagram of a direct coating process for fabricating a cell, in accordance with an example embodiment of the disclosure. This process comprises physically mixing the active material, conductive additive, and binder together, and coating it directly on a current collector. This example process comprises a direct coating process in which an anode or cathode slurry is directly coated on a copper or aluminum foil, respectively, using a binder such as CMC, SBR, Sodium Alginate, PAI, PI and mixtures and combinations thereof.

In step 301, the raw electrode active material may be mixed using a binder/resin (such as PI, PAI), solvent, and conductive carbon. For example, for the anode, graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon powder with a desired particle size and impurity level may then be dispersed in polyamic acid resin (15% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness. Furthermore, cathode active materials may be mixed in step 401, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 303, the anode or slurry may be coated on a copper foil. Similarly, cathode active materials may be coated on a foil material, such as aluminum, for example. In one embodiment, the foil may comprise perforations through the material to allow flow-through of lithiation during operation of the cell.

The active material may undergo a drying in step 305 resulting in less than 12-18% residual solvent content. An optional calendering process may be utilized in step 305 where a series of hard pressure rollers may be used to finish the film/substrate into a smoother and denser sheet of material. In step 307, the foil and coating proceeds through a roll press for lamination.

In step 309, the active material may be pyrolyzed by heating to 500-1200° C. such that carbon precursors are partially or completely converted into carbon. For pyrolysis, a thermal gradient between the metal current collector and the active material being pyrolyzed may enable higher temperatures for the active material without adversely affecting the metal foil. This may be enabled by cooling channels near or in contact with the foil while heat or laser sources pyrolyze the active material. Furthermore, cooling channels near or in contact with the foils can speed the cooling process following pyrolysis, which may be a significant time considering the exponential nature of cooling.

The pyrolysis step may result in an anode active material having silicon content greater than or equal to 50% by weight, where the anode has been subjected to heating at or above 400 degrees Celsius. Pyrolysis can be done either in roll form or after punching in step 311. If done in roll form, the punching is done after the pyrolysis process. The punched electrodes may then be sandwiched with a separator and electrolyte to form a cell. In step 313, the cell may be subjected to a formation process, comprising initial charge and discharge steps to lithiate the anode, with some residual lithium remaining, and the cell capacity may be assessed.

Figure 4:
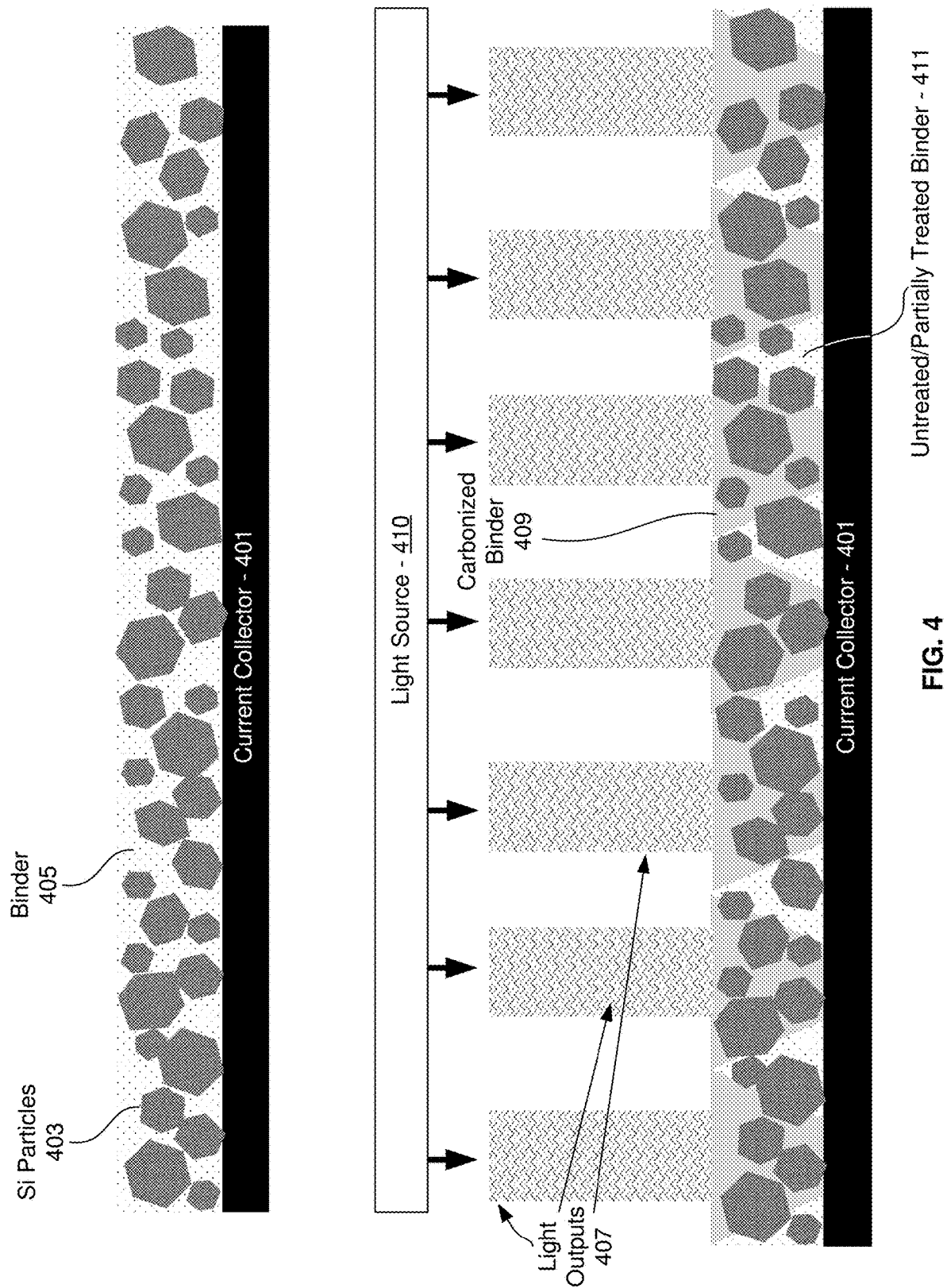
FIG. 4 illustrates pyrolysis of electrodes, in accordance with an example embodiment of the disclosure.

FIG. 4 illustrates pyrolysis of electrodes, in accordance with an example embodiment of the disclosure. Referring to FIG. 4, there is shown a current collector 401 with active material comprising silicon particles 403 and binder material 405 formed thereon. The silicon particles 403 and binder material 405 may be as described above, where the upper figure shows the anode prior to pyrolysis. The lower figure shows the layer being pyrolyzed by a plurality of light outputs 407 from light source 410. In one example embodiment, the light source 401 comprises one or more $CO_2$ lasers, which can pyrolyze binder material without being absorbed by the current collector 401 comprising copper, for example.

The presence of the metal current collector 401 introduces challenges to pyrolysis by conventional heating, using sources such as radiant heat from resistive heating elements. With conventional heating, for binder 405 to be pyrolyzed, the temperatures may be high enough for an adverse reaction between silicon and the metal current collector 401. A direct coating method for roll to roll processing may utilize a heat treatment step at 550° C. This process may have issues with cell performance likely because it may be problematic to reach higher pyrolysis temperatures with conventional heating, particularly with a high-speed process with a line speed of up to 100 m/min or more. This may be mitigated by using laser sources to pyrolyze the materials. For example, a $CO_2$ laser with a 10.6 µm wavelength can carbonize PI film in milliseconds and standard $CO_2$ lasers do not damage copper films. Furthermore, $CO_2$ laser light with a wavelength of 10.6 µm is not absorbed by pure silicon. This laser pyrolysis process may be applied to both direct coated materials or transfer laminated active materials.

The light outputs 407 may be configured at different intensities, wavelength, spacing, and/or spot sizes to configure the pyrolyzed pattern, thereby leaving untreated/partially treated binder 411, which may configure the layer flexibility, while still fully carbonizing portions of the binder, carbonized binder 409, for desired cell performance. In addition, if the bottom of the binder 405 remains as untreated/partially treated binder 411, adhesion to the current collector 401 may be increased. Furthermore, the light source 410 may be tailored to optimize anode performance by controlling laser focal point, power, pattern (e.g. chessboard like), where non-pyrolyzed sections of the active material may provide strain absorbing regions during lithiation, for example.

While $CO_2$ lasers are described in this example, other light sources may be utilized, depending on the absorption spectra of the binder 405 and the silicon particles 403, and how much radiation is absorbed by the metal in the current collector 401. For example, ultraviolet sources may be utilized, microwave heating, inductive heating, and/or infrared heating lamps. These sources may comprise arrays of light sources, for example, to enable a high-speed production process.

Figure 5:
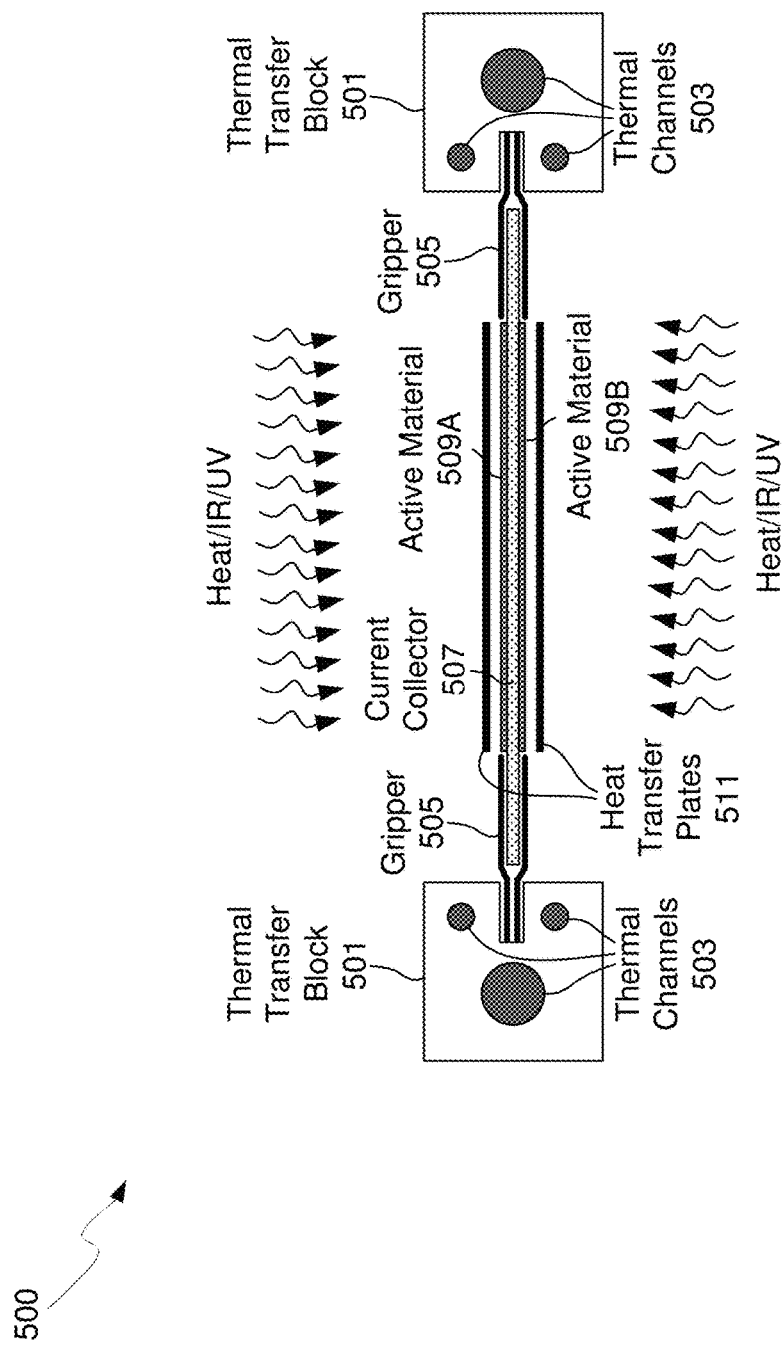
FIG. 5 illustrates a thermal control apparatus for providing a thermal gradient during active material pyrolysis, in accordance with an example embodiment of the disclosure.

FIG. 5 illustrates a thermal control apparatus for providing a thermal gradient during active material pyrolysis, in accordance with an example embodiment of the disclosure. Referring to FIG. 5, there is shown thermal control apparatus 500 comprising thermal transfer blocks 501 and grippers 505. The thermal transfer blocks 501 may comprise metal, for example, for providing good thermal transfer to and from electrodes being subjected to pyrolysis. An example two-sided electrode is shown in FIG. 5 comprising current collector 507 with active materials 509A and 509B on opposite sides. There are also shown optional heat transfer plates 511 that may be placed on or adjacent to the active material 509A and 509B for providing heat when pyrolyzing. These plates may be used when heating elements are utilized but would not likely be used in instances where the heating source is a laser if an opaque material were used for the plates 511.

FIG. 5 illustrates a cross-sectional view of the apparatus, where this structure may extend linearly for a linear process flow, or may be curved into a spiral shape for coil-based processing, for example. The thermal transfer blocks 501 may comprise a plurality of thermal channels 503 that may comprise hollow channels in the blocks for cooling fluids to flow through. The grippers 505 may comprise mounting structures for holding electrodes via the uncoated edges of the current collectors and may also have high thermal conductance, such as metals, for transferring heat to and from the current collectors 507.

In the example shown, the active material 509A and 509B may be heated by conventional heat sources, such as resistive elements, or other sources such as IR or UV lasers or lamps, microwaves, or inductive heating, as disclosed above with respect to FIG. 4. The heat/light source may be utilized to pyrolyze the active material 509A and 509B, while cooling fluids may flow through the thermal channels 503, thereby absorbing some of the heat in the current collector 507. In this manner the top surfaces of the active material 509A and 509B may be fully pyrolyzed, while the active material nearest the current collector 507 may be un-pyrolyzed or only partially pyrolyzed. As described above, this may increase adhesion of the active material 509A and 509B and increase flexibility of the material, both of which may improve battery cycle life. Furthermore, the thermal channels 503 may enable faster cooling of the electrode after pyrolysis, improving production speeds and throughput.

In another example scenario, if it is desired for the current collector to be heated but to a different temperature than the top surfaces of the active material 509A and 509B, heated fluid may flow through the thermal channels 503 during pyrolysis, an then cooling fluid during cool down. In another example, one or more of the thermal channels may be for heating and one or more other channels may be for cooling.

FIGS. 6A-6C illustrate another example pyrolysis method and apparatus with thermal gradients, in accordance with an example embodiment of the disclosure. Referring to FIG. 6, there is shown electrode pyrolysis apparatus 600 comprising an electrode 601, two heating sheets 603A and 603B, and a power source 605.

In this example, the electrode 601 is rolled with one or two heating sheets, plates, or foils, with two shown in FIG. 6A, although a single sheet, plate, or foil could also be used to heat both sides of the electrode depending on the tightness on the spiral, as shown in FIG. 6B. The heating sheets 603A and 603B may comprise Cu, Al, graphite or another material with high thermal conductivity. In some examples, one sheet may be for heating and the other for cooling. The heating and conversion of the materials in the active material layer (e.g. a polymer precursor to carbon) may be achieved by heating the heating sheet with power supplied by power source 605. In one example, resistive heat is generated by the power source 605 and the heating sheets 603A and 603B. In another example, electromagnetic radiation is utilized to heat the heating sheets 603A and 603B, such as by infrared or RF heating where the heating sheets 603A and 603B comprise a carbon material that absorbs RF energy to heat. For example, the heating sheets could be silicon carbide that is heated by an RF signal. Another example is inductive heating, where the heating sheets 603A and 603B are inductively coupled to power source 605.

At the same time, the current collector of the electrode could be cooled so that there is a thermal gradient within the active material. This may be achieved by cooling clamps on the exposed regions of the current collector, as shown in FIG. 5, arranged along the coiled sheets. This would allow for the material in the active material layer that is closest to the current collector to stay in the polymer form which helps with adhesion and cohesion while the material in the active material layer that is farther away from the current collector could be substantially more converted to the final material (e.g. carbon).

The electrode roll may be offset to allow the heating sheet or heating sheets to be heated from one side while the electrode current collector is simultaneously cooled from the other side of the cylinder. FIG. 6C illustrates such a scenario, where sheet 603C is a heating sheet adjacent to the active layer of the electrode 601 and the cooling is made via the current collector. This induces a thermal gradient across the electrode that more fully pyrolyzes the active layer while partially converting the lower part of the active layer by the current collector. Conductive clips may be utilized for cooling via the current collector, as described with respect to FIG. 5.

The heating and cooling methods described above result in a gradation in pyrolysis from the top surface of the active material to the bottom surface at the current collector. The active material is significantly less pyrolyzed on the surface of the current collector, e.g. less than 25%, and significantly more pyrolyzed away from the current collector, e.g., greater than 75%. In another example, the top surface may be more than 90% pyrolyzed and the surface by the current collector may be less than 10% pyrolyzed. Finally, as shown in FIG. 4, portions of the active material may not be pyrolyzed at all while other portions are 50% to 100% pyrolyzed.

The variation may depend on the heating source, intensity, pyrolysis duration, and cooling of the current collector, for example. In one example, the pyrolysis varies from nearly 100% pyrolyzed at the surface to essentially unpyrolyzed at the current collector with an exponential variation in pyrolysis there between. In another example, the variation may be linear. The pyrolysis variation may be manifested by weight loss during pyrolysis, where at the surface, the weight loss is 50% greater, 2× greater, or more than 10 times greater than at the current collector side of the active material. The pyrolysis weight loss may result in a corresponding density variation from the outer surface to the inner surface, where the inner surface may be 50% greater, 2× greater, or more than 10 times greater than at the outer surface of the active material.

Another result of varying pyrolysis is a variation in resistivity of the heat-treated binder. For example, at the surface where it is more pyrolyzed, the resistivity is lower, such that at the current collector side the resistivity may be >50% higher, more than 2× higher, more than 5× higher, or more than 10× higher than at the outer surface. Accordingly, the resistivity may vary exponentially from the top surface to the current collector surface of the active material. Alternatively, the resistivity may vary linearly from the top surface to the current collector surface of the active material. Other types of variation may be configured by the heat source, intensity, duration, and current collector cooling, for example.

In an example embodiment of the disclosure, a method and system are described for thermal gradient during electrode pyrolysis. The method may comprise fabricating the battery electrode by pyrolyzing an active material on a metal current collector, wherein the active material comprises silicon particles in a binder material, the binder material being pyrolyzed more than 75% at an outer surface and less than 50% at an inner surface in contact with the current collector. The active material may be pyrolyzed by electromagnetic radiation. The electromagnetic radiation may be provided by one or more lasers, where the one or more lasers comprises one or more $CO_2$ lasers. The electromagnetic radiation using may be provided by one or more infrared lamps. An outer edge of the current collector may be gripped using a thermal transfer block that removes heat from the current collector during pyrolysis of the active material and subsequent cool down. Heat transfer plates may be placed on or adjacent to the active material during pyrolysis. The electrode and heat transfer plates may be wound into a spiral. The metal current collector may comprise one or more of: copper, nickel, and aluminum. The active material may comprise more than 50% silicon. The active material may be more than 50% more resistive at the inner surface than at the outer surface. A density of the pyrolyzed binder may be 50% higher at the inner surface compared to the outer surface.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery electrode, the electrode comprising:
a metal current collector and active material formed on one or more surfaces of the current collector, wherein the active material comprises silicon particles in a binder material, the binder material being pyrolyzed such that a resistance at an inner surface of the active material in contact with the current collector is at least 50% higher than a resistance at an outer surface of the active material.

2. The electrode according to claim 1, wherein the active material is pyrolyzed by electromagnetic radiation.

3. The electrode according to claim 2, wherein the electromagnetic radiation is supplied by one or more lasers.

4. The electrode according to claim 3, wherein the one or more lasers comprises one or more $CO_2$ lasers.

5. The electrode according to claim 2, wherein the electromagnetic radiation is supplied by one or more infrared lamps.

6. The electrode according to claim 2, wherein the electromagnetic radiation is microwave radiation.

7. The electrode according to claim 1, wherein a thermal transfer block grips an outer edge of the current collector and removes heat from the current collector during pyrolysis of the active material and subsequent cool down.

8. The electrode according to claim 1, wherein heat transfer plates, sheets, or foils are placed on or adjacent to the active material during pyrolysis.

9. The electrode according to claim 8, wherein the electrode and heat transfer plates, sheets, or foils are wound into a spiral.

10. The electrode according to claim 1, wherein the metal current collector comprises one or more of: copper, nickel, and aluminum.

11. The electrode according to claim 1, wherein the active material comprises more than 50% silicon.

12. The system according to claim 1, wherein a density of the pyrolyzed binder is 50% higher at the inner surface compared to the outer surface.

13. A method of forming a battery electrode, the method comprising:
fabricating the battery electrode by pyrolyzing an active material on a metal current collector, wherein the active material comprises silicon particles in a binder material, the binder material being pyrolyzed such that a resistance at an inner surface of the active material in contact with the current collector is at least 50% higher than a resistance at an outer surface of the active material.

14. The method according to claim 13, comprising pyrolyzing the active material using electromagnetic radiation.

15. The method according to claim 14, comprising providing the electromagnetic radiation using one or more lasers.

16. The method according to claim 15, wherein the one or more lasers comprises one or more $CO_2$ lasers.

17. The method according to claim 14, comprising providing the electromagnetic radiation using one or more infrared lamps.

18. The method according to claim 14, wherein the electromagnetic radiation is microwave radiation.

19. The method according to claim 13, comprising gripping an outer edge of the current collector using a thermal transfer block that removes heat from the current collector during pyrolysis of the active material and subsequent cool down.

20. The method according to claim 13, comprising placing heat transfer plates, sheets, or foils on or adjacent to the active material during pyrolysis.

21. The method according to claim 20, wherein the electrode and heat transfer plates, sheets, or foils are wound into a spiral.

22. The method according to claim 13, wherein the metal current collector comprises one or more of: copper, nickel, and aluminum.

23. The method according to claim 13, wherein the active material comprises more than 50% silicon.

24. The method according to claim 13, wherein a density of the pyrolyzed binder is 50% higher at the inner surface compared to the outer surface.

25. A method of forming a battery electrode, the method comprising:
heat treating an active material on a metal current collector, wherein the active material comprises silicon particles in a binder material, the active material being at least twice as resistive at an inner surface in contact with the metal current collector than at an outer surface of the active material; and
cooling the current collector by gripping an outer edge of the current collector using a thermal transfer block that removes heat from the current collector during heat treatment of the active material and subsequent cool down.

* * * * *